United States Patent
Huang et al.

(10) Patent No.: US 12,332,544 B2
(45) Date of Patent: Jun. 17, 2025

(54) LENS DRIVING DEVICE, CAMERA DEVICE AND ELECTRONIC APPARATUS

(71) Applicant: New Shicoh Motor Co., Ltd., Zhejiang (CN)

(72) Inventors: Zhezhu Huang, Yamato (JP); Kei Onodera, Yamato (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 468 days.

(21) Appl. No.: 17/891,650

(22) Filed: Aug. 19, 2022

(65) Prior Publication Data

US 2023/0073642 A1   Mar. 9, 2023

(30) Foreign Application Priority Data

Sep. 8, 2021   (CN) .......................... 202111051608.3

(51) Int. Cl.
G03B 13/36 (2021.01)

(52) U.S. Cl.
CPC .................................. *G03B 13/36* (2013.01)

(58) Field of Classification Search
CPC .. G03B 13/36; G03B 5/06; G03B 2205/0007; G03B 2205/0053; G03B 5/00
See application file for complete search history.

(56) References Cited

U.S. PATENT DOCUMENTS

| 2014/0375875 | A1* | 12/2014 | Yeo ........................ G03B 13/34 348/373 |
| 2015/0212291 | A1 | 7/2015 | Lee et al. |
| 2023/0288777 | A1* | 9/2023 | Son .................... H04N 23/6812 |

* cited by examiner

*Primary Examiner* — James A Dudek
(74) *Attorney, Agent, or Firm* — Hayes Soloway P.C.

(57) ABSTRACT

A lens driving device includes: a fixed portion; a movable portion including a lens carrier that holds a lens body; a middle portion provided between the fixed portion and the movable portion; a first elastic support member movably supporting a front portion of the middle portion with respect to the fixed portion in a direction orthogonal to an optical axis of the lens body; and a second elastic support member movably supporting the movable portion with respect to a rear portion of the middle portion in a direction orthogonal to the optical axis of the lens body.

9 Claims, 4 Drawing Sheets

LENS DRIVING DEVICE, CAMERA DEVICE AND ELECTRONIC APPARATUS

CROSS-REFERENCE TO RELATED APPLICATIONS

This application claims the benefit of Chinese Patent Application No. 202111051608.3 filed Sep. 8, 2021, which is hereby incorporated by reference herein in its entirety.

TECHNICAL FIELD

The present disclosure relates to a lens driving device used in electronic apparatus such as smartphones, a camera device and an electronic apparatus.

BACKGROUND

Lens driving devices having both an optical image stabilizing system function and an auto focus function are known. As an example of documents disclosing such lens driving devices, U.S. Patent Application laid-open No. 2015/0212291A1 (hereinafter referred to as "Patent Document 1") can be given. In the lens driving device of this Patent Document 1, a movable portion including a bobbin holding the lens body is supported on a base, which is a fixed portion, by a support member made of an elastic body, and the movable portion is driven in a direction orthogonal to the optical axis of the lens body.

SUMMARY

In a conventional lens driving device, when the driving stroke of a movable portion increases, the stress applied to the components constituting the device increases, and the risk that the components are deformed or damaged increases. Therefore, there is a problem that it was difficult to prolong the driving stroke of the movable portion. The present disclosure has been made in view of such a problem, and the present disclosure aims to provide a lens driving device. The lens driving device can prolong the driving stroke of the movable portion. To achieve the above-described object, in accordance with a first aspect of the present disclosure, there is provided a lens driving device including: a fixed portion; a movable portion including a lens carrier that holds a lens body; a middle portion provided between the fixed portion and the movable portion; a first elastic support member movably supporting a front portion of the middle portion in a direction orthogonal to an optical axis of the lens body with respect to the fixed portion; and a second elastic support member movably supporting the movable portion in a direction orthogonal to the optical axis of the lens body with respect to a rear portion of the middle portion.

In accordance with a second aspect of the present disclosure, there is provided a camera device including the lens driving device described above.

In accordance with a third aspect of the present disclosure, there is provided an electronic apparatus including the camera device described above.

Further features of the present invention will become apparent from the following description of exemplary embodiments (with reference to the attached drawings).

DETAILED DESCRIPTION

Figure 1:
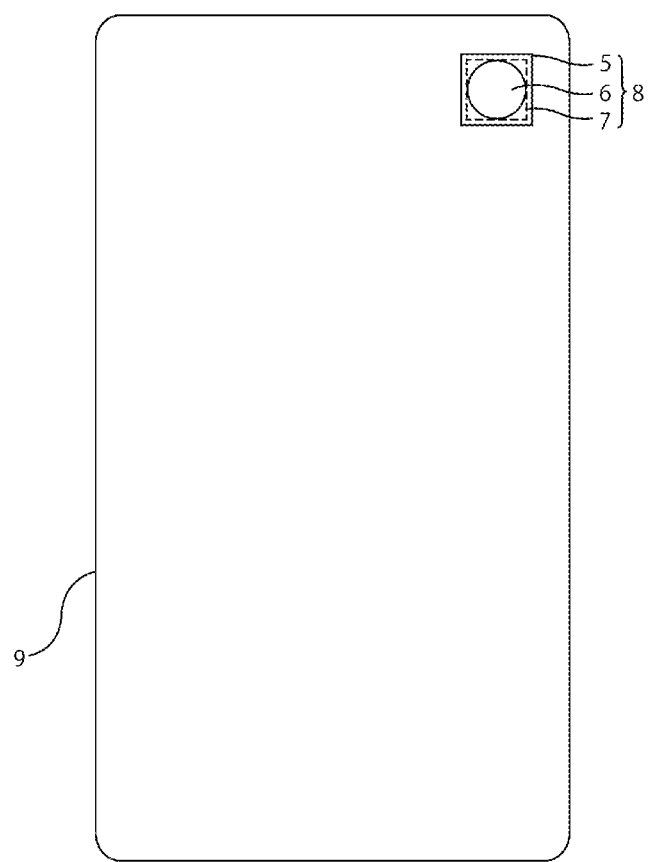
FIG. 1 is a front view of a smartphone 9 on which a camera device 8 including a lens driving device 5 according to one embodiment of the present disclosure is mounted.

Hereinafter, embodiments of the present disclosure are explained with reference to drawings. As shown in FIG. 1, a camera device 8 including a lens driving device 5 according to one embodiment of the present disclosure is accommodated in a smartphone 9.

The camera device 8 has an image sensor 7, a lens body 6 guiding incident light from a subject to the image sensor 7, and a lens driving device 5 driving the lens body 6.

Figure 2:
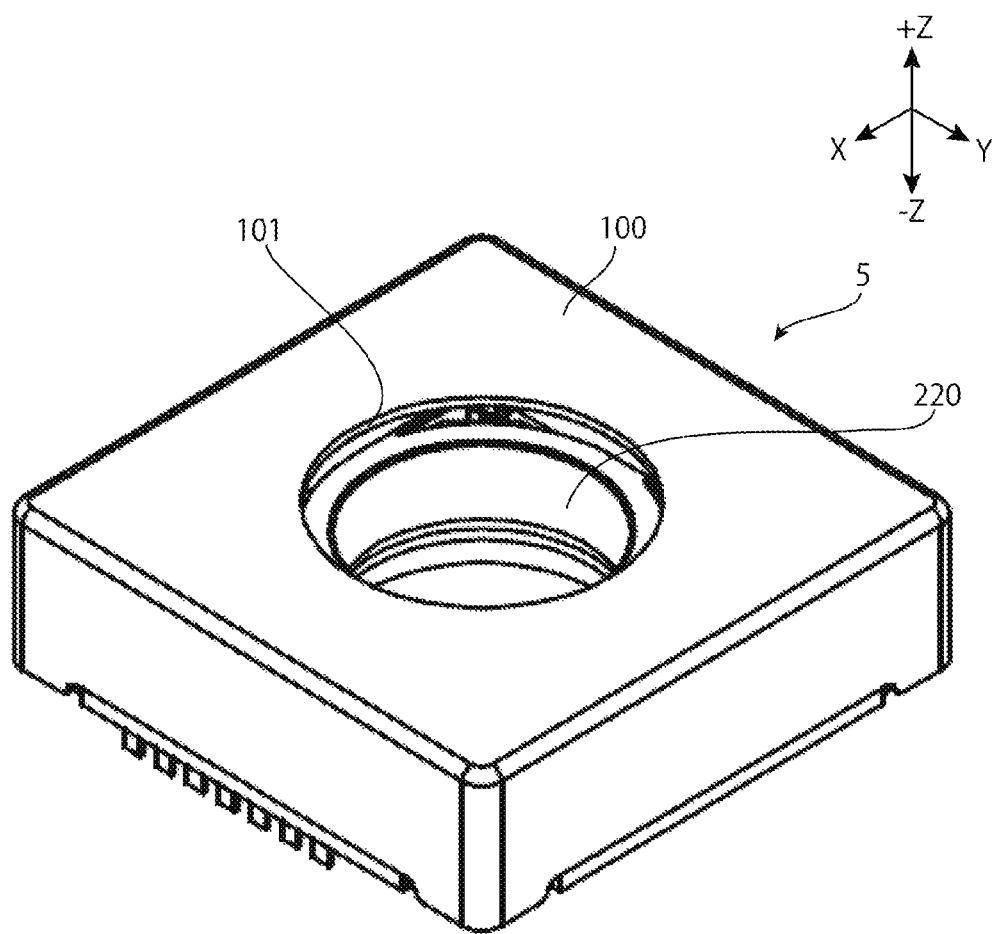
FIG. 2 is a perspective view of the lens driving device 5 shown in FIG. 1.
Figure 3:
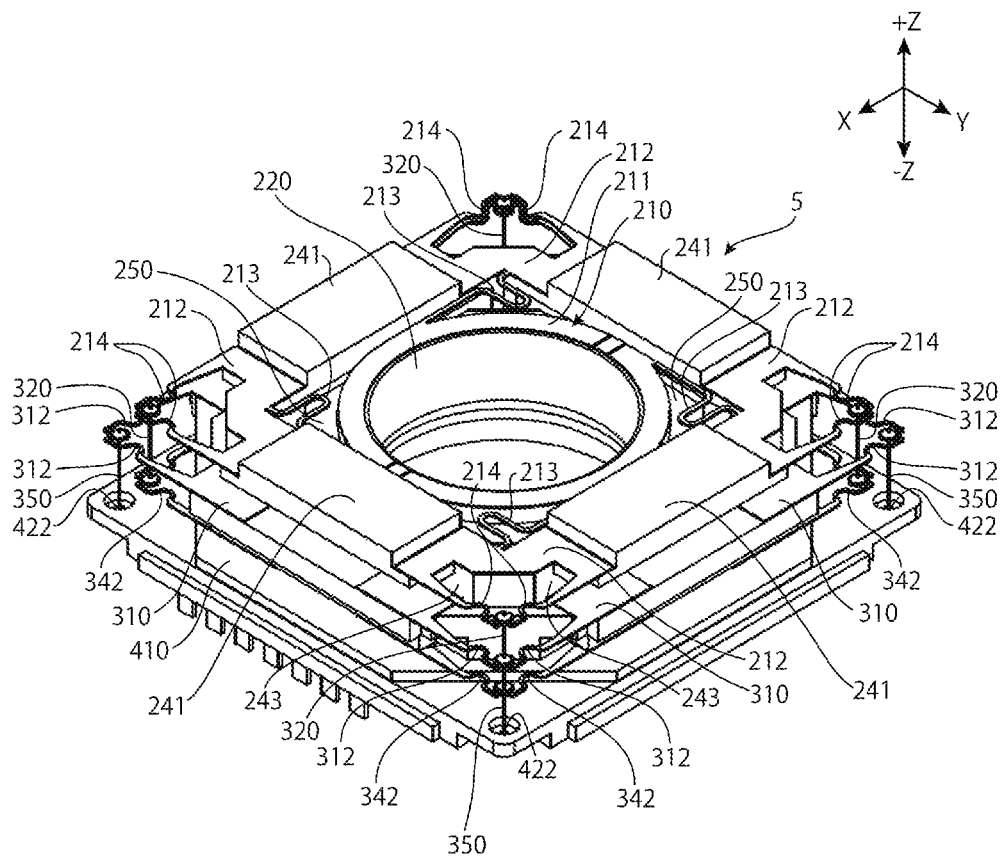
FIG. 3 is a perspective view showing the lens driving device 5 shown in FIG. 2 with the cover 100 removed.
Figure 4:
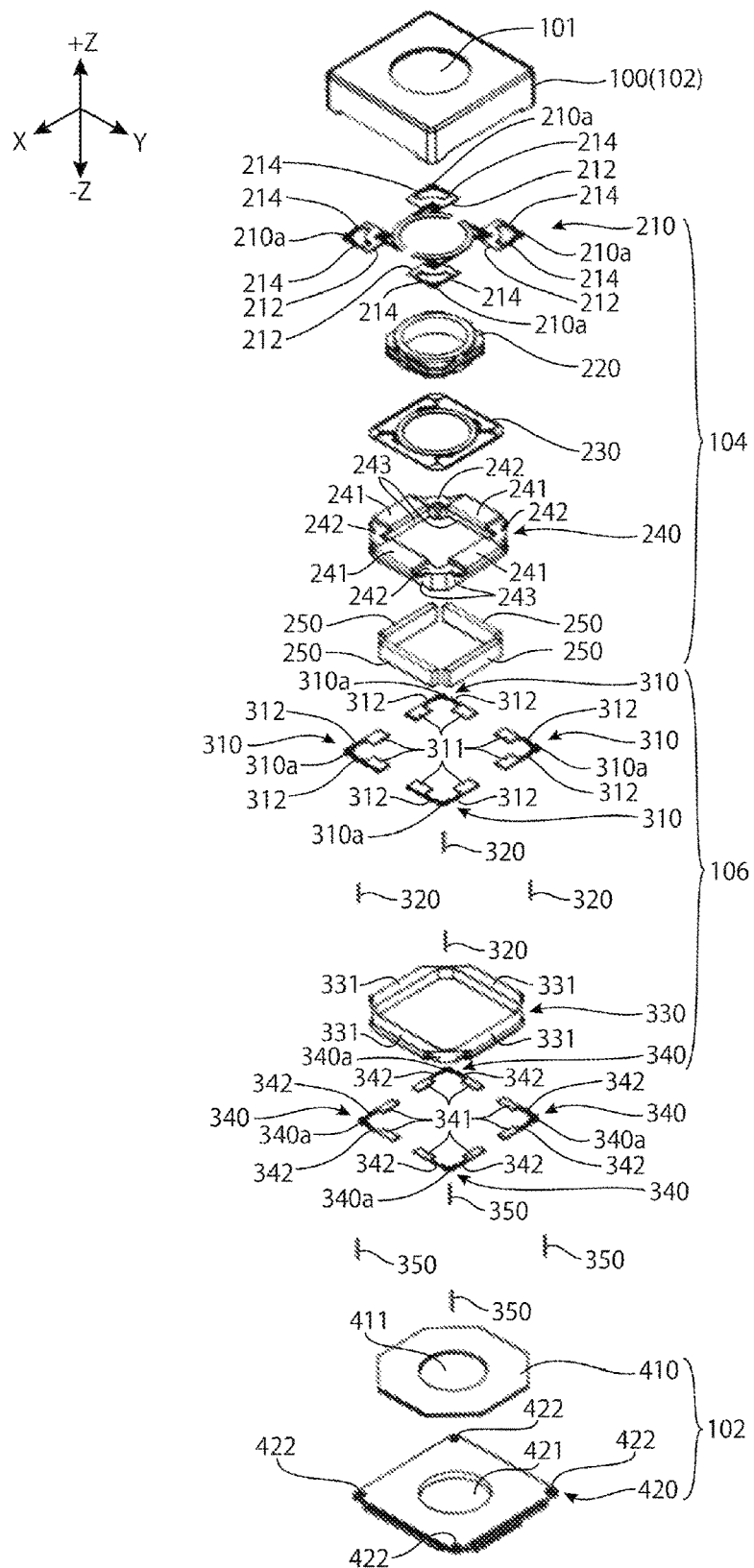
FIG. 4 is an exploded perspective view of the lens driving device 5 shown in FIG. 1.

Hereinafter, as shown in FIGS. 2 and 4, the virtual central axis of the fixed portion 102 to be described later is set as the Z axis, and the lens driving device 5 is manufactured so that the optical axis of the lens body 6 coincides with the central axis (Z axis). The direction of the central axis (Z axis) is referred to as a Z direction. Further, two directions orthogonal to each other in a plane orthogonal to the Z direction are referred to as an X direction and a Y direction. Further, the +Z side may be referred to as a front side and the −Z side may be referred to as a rear side. The coordinate axes in FIG. 2 to FIG. 4 are displayed shifted from their original positions.

As shown in FIG. 4, in the present embodiment, the lens driving device 5 comprises a fixed portion 102, a movable portion 104, a middle portion 106, a first elastic support member and a second elastic support member. The fixed portion 102 has a base 420, a coil substrate 410 and a cover 100. The movable portion 104 has a movable portion basic portion 240, a lens carrier 220, a movable portion front spring 210, a movable portion rear spring 230 and magnets 250. The middle portion 106 has a middle member 330, middle portion front springs 310, and middle portion rear springs 340. The first elastic support member is configured by outer wires 350, and the second elastic support member is configured by inner wires 320. The lens carrier 220 holds the lens body 6. The middle portion 106 is arranged between the fixed portion 102 and the movable portion 104. The first elastic support member movably supports the front portion of the middle portion 106 with respect to the fixed portion 102 in a direction orthogonal to the optical axis of the lens body 6 (i.e. X direction and Y direction). The second elastic support member movably supports the movable portion 104 with respect to the rear portion of the middle portion 106 in a direction orthogonal to the optical axis of the lens body 6.

The cover 100 and the base 420 are quadrangular in outer shape when viewed in the Z direction, and the box-like cover 100 is combined with the plate-like base 420 as a housing. In FIG. 4, respective elements other than the cover 100 and the base 420 are accommodated in the housing comprising the cover 100 and the base 420. The ceiling of the cover 100 has an opening portion 101, and the base 420 also has a similar opening portion 421. Support holes 422 are formed at four corners of the base 420, respectively.

The coil substrate 410 has an outer shape in a quadrangular shape without corner portions when viewed from the Z direction, is provided with an opening portion 411 corresponding to the opening portion 421, and is fixed to the front surface of the base 420. OIS (Optical Image Stabilizer) coils (not shown) are formed at positions corresponding to respective sides in the coil substrate 410.

The lens body 6 is held by the lens carrier 220 in the housing. The light from the subject is incident into the lens driving device 5 from the opening portion 101. This incident light passes through the lens body 6, advances in the optical axis direction (−Z direction) of the lens body 6, passes through the opening portion 411 and the opening portion 421 (see FIG. 4), and reaches the image sensor 7 shown in FIG. 1. The image sensor 7 converts the incident light into an image signal which is an electrical signal.

In the movable portion 104, as shown in FIGS. 3 and 4, the movable portion basic portion 240 has a configuration in which two side wall portions 243 expanding in the XZ direction and two side wall portions 243 expanding in the YZ direction are connected in a quadrangular shape, and further, a front wall portion 241 expanding in the XY direction is provided on the front side of each side wall portion 243. The outer shape of the front wall portion 241 is in a quadrangular shape without corner portions when viewed from the +Z direction, and the inner shape is in a quadrangular shape. A front surface portion 242 is formed such that the front side surface of the front wall portion 241 at a portion close to the corner portion is located slightly rearward of the center portion, and is flush with the front side surface of the side wall portion 243. A plate-like magnet 250 is fixed to the inside surface of each side wall portion 243. The inside surface of the magnet 250 and the inside surface of the front wall portion 241 are almost flush. In addition, the rear surface of the magnet 250 opposes to the OIS (Optical Image Stabilizer) coil.

The lens carrier 220 holding the lens body 6 has a substantially octagonal outer shape and a circular inner shape. An AF (Auto Focus) coil (not shown) is wound around the outer periphery of the lens carrier 220. The lens carrier 220 is arranged at a region surrounded by the side wall portions 243 of the movable portion basic portion 240, and the inside surface of the magnet 250 opposes to the outside surface of the AF coil. The lens carrier 220 is connected to the movable portion basic portion 240 via the movable portion front spring 210 and the movable portion rear spring 230.

As shown in FIG. 3, the movable portion front spring 210 is divided into two and integrally formed with an inner portion 211, outer portions 212, arm portions 213 and paired support springs 214, respectively. The inner portion 211 is formed in a shape along the annular front surface of the lens carrier 220 to be fixed. The outer portion 212 is W-shaped and is fixed one by one on each front surface portion 242 of the movable portion basic portion 240. The arm portion 213 has a winding shape and filiform shape and connects the inner portion 211 and the outer portion 212. The support springs 214 extend from W-shaped both tip ends of the outer portion 212 along two sides holding this corner portion while spaced apart from the movable portion basic portion 240 where the outer portion 212 is fixed at each corner portion of the quadrangular shape, and intersect to be integrally connected. The front end of the inner wire 320, which is the second elastic support member, is arranged and fixed at this intersecting region, and the intersecting region is a third connecting portion 210a where the second elastic support member is connected. In addition, the two divided movable portion front springs 210 are electrically insulated mutually and are connected to the AF coil, and thereby the movable portion front spring 210 becomes an electrification path to the AF coil. In that case, it is desirable to electrically connect the middle portion front spring 310 and the middle portion rear spring 340.

The movable portion rear spring 230 has an inner portion fixed to the rear surface of the lens carrier 220, an outer portion fixed to the rear surface of the side wall portion 243 of the movable portion basic portion 240, and an arm portion connecting the inner portion and the outer portion, but the movable portion rear spring 230 does not have configurations such as the support springs 214.

The front surface of the lens carrier 220 is connected to the front surface of the movable portion basic portion 240 via the movable portion front spring 210. Similarly, the rear surface of the lens carrier 220 is connected to the rear surface of the movable portion basic portion 240 via the movable portion rear spring 230. Thus, the lens carrier 220 is movable in the optical axis direction (Z direction) inside the movable portion basic portion 240. The lens carrier 220 is driven in the Z axis direction by an electromagnetic force due to the magnetic field generated by four magnets 250 and the electric current flowing in the coil of the lens carrier 220.

As shown in FIG. 4, the middle member 330 has a configuration in which two side wall portions 331 expanding in the XZ direction and two side wall portions 331 expanding in the YZ direction are connected in a square shape, and has an outer shape of a quadrangular shape without corner portions and an inner shape of a quadrangular shape. The side wall portion 331 is formed in a stepped structure, the outer shape of the quadrangular shape is formed smaller in the rear side portion than in the front side portion, and the size of the outer shape of this rear side portion is the same as the size of the outer shape of the quadrangular shape of the front wall portion 241 of the movable portion basic portion 240.

As shown in FIG. 4, the middle portion front springs 310 are provided corresponding to the four corners of the middle member 330, respectively. The middle portion front spring 310 is integrally formed with two plate portions 311 and a pair of support springs 312. The plate portions 311 are respectively fixed to the front surfaces of two side wall portions 331 orthogonal to hold a corner portion of the quadrangular shape. The plate portion 311 has a quadrangular shape with a width corresponding to the width of the front surface of the side wall portion 331. The pair of support springs 312 extends in directions approximately orthogonal to each other along two sides holding this corner portion while spaced apart from the middle member 330 where these two plate portions 311 are fixed, and intersect to be integrally connected. The front end of the outer wire 350, which is a first elastic support member, is arranged and fixed at this intersecting region, and the intersecting region is a first connecting portion 310a where the first elastic support member is connected.

Similarly, the middle portion rear springs 340 are provided corresponding to the four corners of the middle member 330, respectively. The middle portion rear spring 340 is integrally formed with two plate portions 341 and a pair of support springs 342. The plate portions 341 are respectively fixed to the rear surfaces of two side wall portions 331 orthogonal to hold a corner portion of the quadrangular shape. The plate portion 341 has a quadrangular shape with a width corresponding to the width of the rear surface of the side wall portion 331. The pair of support springs 342 extends in directions approximately orthogonal to each other along two sides holding this corner portion while spaced apart from the middle member 330 where these two plate portions 341 are fixed, and intersect to be integrally connected. The rear end of the inner wire 320, which is the second elastic support member, is arranged and fixed at the intersecting region, and the intersecting region is a second connecting portion 340a where the second elastic support member is connected.

In the present embodiment, when viewed from the optical axis direction (the Z direction), the position of the first connecting portion 310a corresponds to the quadrangular shape of the front surface of the middle member 330, and the position of the second connecting portion 340a corresponds to the quadrangular shape of the rear surface of the middle member 330. The position of the first connecting portion 310a is outwardly located with respect to the position of the second connecting portion 340a. Similarly, when viewed from the optical axis direction (the Z direction), the position of the third connecting portion 210a corresponds to the quadrangular shape of the front wall portion 241 of the movable portion basic portion 240, and is located so as to correspond to the position of the second connecting portion 340a. Further, when viewed from the optical axis direction, the support hole 422 of the base 420 is located so as to correspond to the first connecting portion 310a.

The four inner wires 320 and the four outer wires 350 extend in the optical axis direction. The positions of four outer wires 350 are outwardly located with respect to the four inner wires 320 in the XY plane.

The front ends of the four inner wires 320 are fixed by soldering to the third connecting portions 210a of the support springs 214 in the movable portion front spring 210. The rear ends of the four inner wires 320 are fixed by soldering to the second connecting portions 340a of the support springs 342 in the middle portion rear springs 340. The four inner wires 320 function as the second elastic support members supporting the movable portion 104 with respect to the rear portion of the middle portion 106.

The support springs 214 of the movable portion front spring 210 and the support springs 342 of the middle portion rear spring 340 also relieve the stress applied to the inner wire 320. The front ends of the four outer wires 350 are fixed by soldering to the first connecting portions 310a of the support springs 342 in the middle portion front springs 310. Further, the rear ends of the four outer wires 350 are inserted into the support holes 422 of the base 420 and fixed by soldering. A metal plate is embedded in the base 420 and exposed so as to be soldered at the support holes 422. The four outer wires 350 function as the first elastic support members supporting the front portion of the middle portion 106 with respect to the base 420 of the fixed portion 102. The metal plate can also be electrically connected to an external terminal to form an electrification path to the AF coil. In that case, in the electrification path, the external terminal, the metal plate, the outer wires 350, the middle portion front springs 310, the electrification path described above, the middle portion rear springs 340, the inner wires 320, the movable portion front spring 210, and the AF coil are used.

The support springs 312 of the middle portion front spring 310 also relieve the stress applied to the outer wire 350.

The OIS coil and the magnets 250 of the coil substrate 410 constitute a driving portion that drives the movable portion 104 in a direction orthogonal to the optical axis of the lens body 6. More specifically, in the present embodiment, by the reaction force against the electromagnetic force generated due to the magnetic field by the magnets 250 and the electric current flowing in the OIS coil of the coil substrate 410, the driving force in the direction orthogonal to the optical axis of the lens body 6 is applied to the magnets 250, and the movable portion basic portion 240 is driven together with the lens carrier 220.

In this way, in the present embodiment, the groups of the AF coil of the lens carrier 220 and the magnets 250 drives the lens carrier 220 in the movable portion basic portion 240 in the Z axis direction which is the optical axis direction of the lens body 6, and the groups of the OIS coil of the coil substrate 410 and the magnets 250 drives the movable portion basic portion 240 together with the lens carrier 220 in the direction orthogonal to the optical axis of the lens body 6.

As described above, the lens driving device 5 of the present embodiment includes: a fixed portion 102; a movable portion 104 including a lens carrier 220 that holds a lens body 6; a middle portion 106 provided between the fixed portion 102 and the movable portion 104; outer wires 350 which are the first elastic support members movably supporting the front portion of the middle portion 106 with respect to the fixed portion 102 in a direction orthogonal to the optical axis of the lens body 6; and inner wires 320 which are the second elastic support members movably supporting the movable portion 104 with respect to the rear portion of the middle portion 106 in the direction orthogonal to the optical axis of the lens body 6. Therefore, according to the present embodiment, even if the drive stroke of the entire movable portion 104 is long, the drive stroke of each of the first elastic support members and the second elastic support members is not lengthened. Accordingly, stress applied to the components constituting the device does not increase, and deformation or breakage is unlikely. Thus, the lens driving device 5 of the present embodiment can lengthen the drive stroke of the movable portion 104.

In the present embodiment, when the driving force in the direction orthogonal to the optical axis of the lens body 6 is applied to the movable portion 104, the outer wires 350 and the inner wires 320 are elastically deformed, and the movable portion 104 moves in a direction of the driving force. Therefore, even if the drive stroke of the movable portion 104 increases, the first elastic support members and the second elastic support members share the elastic deformation, so that the stress can be prevented from becoming excessively large. For example, for an conventional elastic support member, a case where the lengths of the inner wire 320 and the outer wire 350 are the same, the mechanical characteristics are also the same, as well as the upper limits of the stroke (hereinafter referred to as maximum stroke) that do no cause damage or plastic deformation in driving are the same, can be considered. In the present embodiment, even if driving is performed with a stroke equivalent to twice the conventional maximum stroke, breakage and plastic deformation can be avoided.

Further, the length of the elastic support member can be lengthened to increase the maximum stroke. However, increasing the length of the elastic support member not only increases the dimension in the Z direction but also decreases the mechanical strength of the elastic support member. According to the present embodiment, the front end of the first elastic support member (outer wire 350) is connected to the first connecting portion 310a provided at the front portion of the middle portion 106, and the rear end of the second elastic support member (inner wire 320) is connected to the second connecting portion 340a provided at the rear portion of the middle portion 106. In the Z direction, the outer wire 350 and the inner wire 320 overlap between the first connecting portion 310a and the second connecting portion 340a, the dimension of the lens driving device 5 in the Z direction can be made smaller than lengthening the length of the elastic support member, and the mechanical strength also does not decrease. Further, when viewed from the direction of the optical axis (the Z direction), because the position of the first connecting portion 310a is outwardly located more than the position of the second connecting portion 340a, the outer wire 350 and the inner wire 320 do not interfere with each other.

It is to be noted that, in the embodiment described above, the position of the first connecting portion 310a may be arranged on an inner side than the position of the second connecting portion 340a when viewed from the optical axis direction. Further, the outer wire 350 and the inner wire 320 may have the same material, the same length, and the same diameter, but at least one of them may be different. Further, the movable portion front spring 210 may be separately provided with a part of outer portion 212-arm portion 213-inner portion 211, and a part of outer portion 212-support spring 214. Further, the interval between the movable portion front spring 210 and the movable portion rear spring 230 in the Z direction may be the same or different on the lens carrier 220 side and the movable portion basic portion 240 side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A lens driving device, comprising:
   a fixed portion;
   a movable portion comprising a lens carrier supporting a lens body;
   a middle portion having a front portion and a rear portion opposite the front portion, the middle portion positioned between the fixed portion and the movable portion;
   a first elastic support member movably supporting the front portion with respect to the fixed portion in a direction orthogonal to an optical axis of the lens body; and
   a second elastic support member movably supporting the movable portion with respect to the rear portion in a direction orthogonal to the optical axis of the lens body.

2. The lens driving device according to claim 1, wherein the first elastic support member and the second elastic support member further comprise wires extending along the optical axis direction, wherein a front end of the first elastic support member is fixed to a first connecting portion of the middle portion, a rear end of the second elastic support member is fixed to a second connecting portion of the middle portion and the first connecting portion is located on a front side more than the second connecting portion.

3. The lens driving device according to claim 2, wherein when viewed from a direction of the optical axis, the first connecting portion is outwardly located more than the second connecting portion.

4. The lens driving device according to claim 2, wherein the middle portion comprises:
   a middle member;
   a middle portion front spring attached to the middle member and connected to the first elastic support member; and
   a middle portion rear spring attached to the middle member and connected to the second elastic support member, wherein the first connecting portion is provided at the middle portion front spring and the second connecting portion is provided at the middle portion rear spring.

5. The lens driving device according to claim 4, wherein an outer shape of the middle member is in a quadrangular shape without corner portions when viewed from the direction of the optical axis, the middle portion front spring and the middle portion rear spring each have a pair of support springs extending along two sides holding the corner portion while spaced apart from the middle member at each corner portion of the quadrangular shape, wherein the first connecting portion and the second connecting portion are respectively provided at a region where the pair of support springs intersect.

6. The lens driving device according to claim 5, wherein the movable portion further has a basic portion and when viewed from the direction of the optical axis, the movable portion with the basic portion has a quadrangular shape without corner portions, and a movable portion front spring attached to the basic portion and connecting the second elastic support member, while the front spring has a pair of support springs extending along two sides holding the corner portion while spaced apart from the basic portion at each corner portion of the quadrangular shape and a third connecting portion to which a front end of the second elastic support member is fixed is provided at a region where the pair of support springs intersect.

7. The lens driving device according to claim 6, wherein the movable portion front spring has an arm portion extending inward from each of the corner portions and an inner portion to which the arm portion is connected, and the inner portion is attached to the lens carrier.

8. A camera device comprising the lens driving device according to claim 1.

9. An electronic apparatus comprising the camera device according to claim 8.

* * * * *